March 17, 1931.  W. H. BRADSHAW  1,796,586
ELECTRIC INDICATING MEANS
Filed July 5, 1924

Patented Mar. 17, 1931

1,796,586

UNITED STATES PATENT OFFICE

WILLIAM H. BRADSHAW, OF BROOKLYN, NEW YORK, ASSIGNOR TO AUTO-METER CO. INC., OF NEW YORK, N. Y., A CORPORATION OF DELAWARE

ELECTRIC INDICATING MEANS

Application filed July 5, 1924. Serial No. 724,520.

This invention relates to electric indicating means or devices for indicating the quantity of liquid in a tank of the type as disclosed in the application of M. J. Huggins, Serial No. 723,241 filed June 30th, 1924, embodying an armature of arcuate form supported to rotate about its axis, and a pair of coils or solenoids spaced equal distances from the center of rotation of the armature. The armature is adapted to be actuated to a multiplicity of stable positions by the variable energization of the coils one relative to the other; that is, by an increase in the energization of one coil and a corresponding decrease in the energization of the other coil effected by cutting in variable amounts of resistance into one coil and cutting out a proportional amount of said resistance from the other coil. The armature is also arranged to constitute the indicator by applying means to the peripheral wall with indicator indices thereon.

The object of the present invention is to provide an improved indicating means of this character whereby one coil is adapted to be connected in circuit with a source of electricity to be uniformly energized and generate a magnetic field of constant value, and the other coil differentially energized and adapted to be selectively connected with a source of electricity through either one of a series of circuits independent of the circuit of the uniformly energized coil and generate a magnetic field of variable value. The forces generated by the coils actuate the armature to move it to different stable positions and indicate the quantity of liquid in a series of tanks. The device has been designed in the present instance for connecting the differentially energized coil in either one of two circuits and functions to indicate the quantity of liquid in the gasolene tank and oil in the crank case of the engine of a motor vehicle. An indicator disk having two sets of circularly arranged indices is connected with the armature to participate in the movement thereof.

In the drawings accompanying and forming a part of this specification, Figure 1 is a plan view of the front of a casing in which the improved indicating means is mounted.

Figure 2 is a plan view with a portion of the front or cover plate removed to illustrate the construction and mounting of the indicating means in the casing.

Figure 3 is a side elevation with the casing in section to illustrate the construction and mounting of the indicating means therein.

Figure 3ª is a diagrammatic view to illustrate the electrical connections of the different parts of the indicating means; and Figure 4 is a plan view of an indicator dial for use in connection with the device.

The operative mechanism of the indicating device or instrument illustrated in Figures 1 to 3 is carried and enclosed in a casing comprising a cup shaped member 14 having a face or closure plate 15 releasably connected to the open end, said plate extending laterally beyond the casing to provide a flange whereby the device may be mounted upon a support, such as the instrument board of a motor vehicle. The closure plate 15 is arranged with a pair of openings 16, 17 which are in the nature of windows through which to expose and observe calibrated indices 18, 19 on an indicator disk 20 (Figure 4). The calibration in the present instance is arranged to indicate quantity, the liquid in a tank, such as the gasolene in the gasolene tank of a motor vehicle, by measure, such as gallons, while the other calibration 19 is arranged to indicate quantity by the liquid level in a receptacle or tank, such as the quantity of oil in the crank case of the engine constituting the motive power of a motor vehicle. It will be obvious that the calibration 18 may be arranged to indicate the level of liquid in a tank. The cover plate may have arranged adjacent the one opening 16 the word "gas" to indicate that the quantity of gasolene in the gasolene tank is to be ascertained by the dial calibration exposed through said opening, while the other opening 17 has the word "oil" arranged adjacent thereto to indicate that the quantity of oil in the crank case of the engine is to be ascertained from the dial calibrations exposed and observable through said opening.

The indicator disk 20 is carried by a spindle or shaft 21 having a bearing 22 at one end in the bottom wall of the casing and rotatably supported in a bridge 23 mounted at opposite ends upon posts 24, 25 fixed to the bottom of the casing and projecting upward through openings in the cover or closure plate 15. The dial is actuated to indicate the quantity of gasolene in the gasolene tank by the magnetic forces generated by a pair of solenoids or coils 26, 27 wound upon spools 28, 29 supported in the casing by brackets 30 in angular relation to each other in an arc less than 180 degrees the center of which is the center of rotation of the indicator support 21, and with the centers of the coils spaced substantially equi-distantly from the axis of said support. One terminal 31, 32 of each coil is connected to a contact terminal or binding post 33 carried by and insulated from the casing, said post being arranged for connection of an electric conductor leading from a source of current supply, which in motor vehicle practice comprises a storage battery conventionally shown at B in Figure 3ª. The other terminal 35 of the coil 27 is connected to one terminal of a fixed resistance in the form of a coil 36 and grounded through said coil by connecting the other terminal of the coil with a resilient contact maker in the form of a bar of yielding material 37 mounted intermediate the ends with the opposite ends free upon the bottom of the casing in superposed and insulated relation to a contact maker 38, the latter contact maker also being insulated from the casing with the opposite ends free. The free ends of the contact maker 37 engage below contact makers 39, 40 carried by or integral with sleeves 41, 42 and through said sleeves connected with the source of electric energy, as grounding in the casing. The sleeves are slidably mounted upon the posts 24, 25 and carry insulator push buttons 43, 44 to project through the cover plate concentric with the reduced ends of the posts, the sleeves being normally urged to position with annular shoulders on the push buttons engaging the cover plate and with the contacts 39, 40 out of contact with the contact bar 37 by springs 45, 46 coiled about the posts 24, 25 and confined between the sleeves and bottom of the casing. The terminal 47 of coil 26 is connected to the contact making member 38 and through said member to contact terminals in the form of binding posts 48, 49 mounted in and insulated from the casing below and normally out of contact with the contact maker 38 the coil 26 being adapted to be placed in electrical connection with the battery through binding post 48 by the contact member 39 and the actuating of the button 43 moving one end of contact maker 38 into contact with post 48, and in electrical connection with the battery through binding post 49 through the actuation of the contact members 37, 40 by the push button 44 moving the other end of the contact maker 38 into contact with the post 49 through the movement of contact 37.

The indicator dial is actuated by magnetic forces generated by said coils and the influence of said magnetic forces upon an armature 50′ of arcuate or split ring form and subtending through an arc of less than 360 degrees of magnetizable material, although in some instances it may comprise a polarized member or magnet. This armature is carried by an arm 51 whereby it is fixed to the indicator disk carrying shaft 21 to have movement about its axis and in a plane parallel with the movement of the indicator disk and within the cores of the coil carrying spools 28, 29 and in the lines of force and centers of the flux fields generated by said coils. The coils are so wound and arranegd that the current flow through one coil, in the present instance the coil 26, will generate a magnetic field to exert a directive force upon the armature to move it in the direction of its south pole, indicated by S, the flow of the current through the coil being from the north pole to the south pole, as indicated by N, S, while the other coil 27 will generate a magnetic field to exert a magnetic force upon said armature to move it in the direction of its north pole, indicated by N, the flow of the current through said coil being from the south pole to the north pole, as indicated by S, N.

The actuation of the indicator disk is controlled by the differential energizing of the coil 26 and thereby varying the value of the magnetic force generated by the coil 26 relative to the magnetic force generated by the coil 27 by regulating the current flow through the coil 26 by setting up a resistance to the current flow, the connecting of the resistance into and out of the circuit through the coil being controlled by the quantity of liquid in a tank, such as the quantity of gasolene in the gasolene tank of a motor vehicle, and which quantity it is desired to ascertain. This resistance device is illustrated in a conventional manner at 52 in Figure 3ª there being two shown, one for the use in connection with the gasoline tank, connected at one terminal with the binding post 48, and the other for use in connection with the crank case connected at one terminal with the binding post 49.

The posts 24, 25, sleeves 41, 42 and contact makers 39, 40 are made of electric conducting but non-magnetizable material.

Assuming the dial to be in the position indicated in Figure 2 with the index "¼" of the dial calibration 18 exposed through the window 16, the greater portion of the resistance device will be connected in circuit with the coil 26.

To obtain a reading from the indicating device as to the quantity of liquid in the tank the push button 43 is pushed into the casing thereby electrically connecting the contact 39 with the end of the contact member 37 below the same and thereby closing the circuit for the coil 27 and grounding the same. Further depression of said button will move the one end of the contact bar 38 into electrical connection with the binding post 48 and thereby in circuit with a resistance device and closing the circuit through the coil 26. To compensate for variations in the resistance values of the coils so that each coil will have the same resistance when the both coils are wound with the same number of ampere turns a coil of wire 36 having a predetermined electric resistance is interposed in the connection of the coil 27 with the contact member 37. This is for the purpose of balancing the coils either prior to or after the coils are assembled in the casing. However, due to cutting out and connecting in of different amounts of the resistance device 52, depending upon the quantity and liquid level in the tank, the current flowing through coil 26 will be varied with relation to the current flow through the coil 27 and thereby generate a magnetic force having a variable value relative to the value of the force generated by the coil 27. Should the tank be empty or practically so substantially all of the resistance device will be in circuit with the coil 26 setting up a magnetic field of sufficient strength to exert a directive force upon the armature to move it against the force of the field generated by the coil 27 to move said armature to the limit of its movement in one direction with the index "MT" exposed through the window 16 and indicating that the tank is empty. Should the tank be practically filled to capacity substantially all of the resistance device in the tank will be cut out of circuit with the coil 26 thereby decreasing the force of the magnetic field generated by the coil 26 whereby it is less than the force generated by the coil 27 with the result that the force generated by said coil 27 will exert a force upon the armature to move it against the force exerted thereon by the field generated by the coil 26 and move it and the indicator disk to the limit of its movement in the direction reverse to that in in which it was moved by a force generated by the coil 26 and expose the index "Full" through the window 17.

To adapt the device to measure and indicate the quantity of liquid in a second receptacle or tank, the present device being adapted for indicating the quantity of oil in the crank case of the engine of a motor vehicle, a resistance device which may be constructed and arranged similar to the resistance 52 illustrated in Figure 3ª and hereinbefore described is arranged in the crank case and said resistance device connected to the binding post 49 and through said post and contact maker 38 with the coil 26 to vary the current flow through the coil 26 and thereby influence the disk actuating armature 50, this resistance device being indicated in a conventional manner at 75 in Figure 3ª.

To obtain a reading and ascertain the quantity of liquid in the second tank the push button 44 is depressed connecting the coil 27 in circuit with the battery and grounding said coil through the contact member 40, contact bar 37 and fixed resistance device 36 and thereby maintain the current flow through said coil uniform and generate a magnetic field of uniform value. By depressing the push button further the end of the contact bar 38 will be moved into electrical connection with the contact of the binding post 49 thereby connecting the resistance device 52' in circuit with the coil 26, the current flow through said coil and the force of the magnetic field generated thereby being controlled and regulated by said resistance device through the varying liquid level in said tank in a manner similar to that described in connection with the variable liquid level in the first tank and reiteration of the operation is not deemed necessary.

It may be stated, that should said second tank be half full the magnetic force generated by the one coil 26 relative to the force generated by the coil 27 will be such as to influence the armature to move it to position the indicating disk with the index "Half" of the disk calibration 19 to be exposed through the window 17. To facilitate the ascertaining of the gasoline in the gasoline tank and the oil in the crank case the cover plate is arranged with the word "Gas" adjacent the push button 43 and the word "Oil" adjacent the push button 44.

In the operation of the device should the tank be empty the float will be at the bottom and all of the resistance in the tank will be connected into coil 26, and as either of the push buttons is operated to close the circuits of the coils through the contact makers 37 and 39 or 40 and 38 and 48 or 49 and the armature will be moved under the influence of coil 27 to position the indicator disk and expose the indications "MT" and "Low" through the windows in the casing, this movement of the armature by the coil 27 being effected due to the value of the field generated by said coil being greater than that generated by the coil 26 since the resistance 36 is less than that in the tank. However, should the tank be one-half full with one-half of the resistance in the tank cut out of the coil 26 and equalize the resistance of the coil 36 connected in the circuit of coil 27 and the fields generated by the coils are balanced with the result that the armature will be moved to the intermediate position or position of balance when the indications "½" and "Half" on the indicator disk will be exposed through the casing windows. Should the tank be filled to capacity with the float at the top all of the resistance in the tank will be cut out of coil 26 with the result that the magnetic value generated by said coil will be greater than the field generated by the coil 27 and the armature will be moved under the influence of the magnetic field of coil 26 against the field generated by coil 27 and position the indicator disk to expose the indications "Full" through the casing window.

Having thus described my invention, I claim:

1. In an electric indicating instrument, a coil adapted to be uniformly energized to generate a magnetic field of uniform value, a second coil adapted to be differentially energized to generate a force of varying value, an arcuate armature supported to have oscillatory movement about its axis and arranged to be under the influence of both coils in all positions thereof and moved to different indicating positions by the differential energizing of the one coil, a casing in which said coils and armature are mounted, and means carried by and insulated from the casing to connect said coils in separate circuits comprising a contact terminal carried by and insulated from the casing to which one terminal of each coil is connected, a contact terminal to which the other terminal of the first coil is connected, a contact maker normally urged to position out of contact with said latter contact terminal and adapted to make contact therewith to close the circuit of said coil, a second contact terminal, a second contact maker to which second contact maker the other terminal of the second coil is connected and normally out of contact with said second contact terminal and adapted to be placed in contact therewith to close the circuit of said second coil, and means to actuate said contact makers to simultaneously close the circuits of both coils.

2. In an electric indicating instrument, a casing, an arcuate armature rotatable in the casing about its axis, a disk having indices circularly disposed about the face thereof carried by and participating in the movement of the armature, a pair of coils one adapted to be uniformly energized and the other differentialy energized and said armature being under the influence of said coils in all positions thereof to be moved to different indicating positions by the differential energizing of the one coil, a contact terminal carried by and insulated from the casing to which one terminal of each coil is connected for connection in circuit with a source of electricity, a conductor plate of yielding material to which the other terminal of the uniformly energized coil is electrically connected, a contact maker operative from the exterior of the casing to co-operate with said contact plate to close the circuit of the uniformly energized coil, a second conductor plate of yielding material juxtaposed to and insulated from the first plate to which the other terminal of the differentially energized coil is electrically connected, and a second contact maker carried by and insulated from the casing, said second conductor plate being adapted to be placed in electrical connection with said second contact terminal through movement imparted thereto by the first conductor plate by the contact maker to close the circuit of the differentially energized coil.

3. In an electric indicating instrument, an armature of arcuate form subtending through an arc of less than 360 degrees and pivotally supported to have movement about its axis, a pair of coils spaced equal distances from the axis of the armature and within which coils the armature is adapted to move, one of said coils being adapted to be uniformly energized and the other coil differentially energized and under the influences of which coils the armature is moved to different positions, and a disk to participate in the movement of the armature having indices circularly disposed about the face thereof.

4. In an electric indicating instrument, a casing having a window therein, an armature of arcuate form and subtending through an arc of less than 360 degrees, a support for the armature to rotate about its axis in the casing, a pair of coils fixedly mounted in the casing spaced apart equal distances from the axis of rotation of the armature support and the armature adapted to move within and be under the influence of said coils in all positions thereof, a disk fixed to and rotatable with the armature support contiguous to the casing window and having circularly disposed indices to be exposed through the window, and means within the casing operative from the exterior of the casing to connect the coils in separate circuits with a source of electricity, one coil adapted to be uniformly energized and the other differentially energized.

5. In an electric indicating instrument, an armature of arcuate form subtending through an arc of less than 360 degrees and pivotally supported to have movement about its axis, a pair of coils spaced equal distances from the axis of the armature and the armature adapted to move within and be under the influence of said coils in all positions thereof, a disk to participate in the movement of the armature having two sets of indices circularly disposed about the face thereof, and selective means to connect one coil in circuit with a source of electricity to be uniformly energized and connect the other coil in either one of two circuits with the source of electricity independent of the circuit of the uniformly energized coil and adapted to be differentially energized.

Signed at the city of New York in the county of New York and State of New York this 18th day of June, 1924.

WILLIAM H. BRADSHAW.